(12) United States Patent
Robinson

(10) Patent No.: US 7,444,719 B2
(45) Date of Patent: Nov. 4, 2008

(54) DEVICE FOR ATTACHMENT TO A ROPE

(75) Inventor: Peter Francis Robinson, Adamstown (AU)

(73) Assignee: Peter Robinson, Adamstown Heights ( * ) Notice: Subject to any disclaimer, the term of this patent is extended or adjusted under 35 U.S.C. 154(b) by 245 days.

(21) Appl. No.: 11/511,136

(22) Filed: Aug. 29, 2006

(65) Prior Publication Data

US 2007/0079482 A1    Apr. 12, 2007

(51) Int. Cl.
*A44B 13/00* (2006.01)
(52) U.S. Cl. .................. 24/130; 24/129 C; 24/131 R
(58) Field of Classification Search ............... None
See application file for complete search history.

(56) References Cited

U.S. PATENT DOCUMENTS

| | | | |
|---|---|---|---|
| 858,473 A * | 7/1907 | Sanders | 24/545 |
| 5,325,567 A * | 7/1994 | Mele | 24/122.6 |
| 5,636,413 A * | 6/1997 | Berg et al. | 24/131 R |

* cited by examiner

*Primary Examiner*—Jack W. Lavinder

(57) ABSTRACT

A device (10) is shown for attachment to a rope (12), constructed from twisted strands (13,14,15). The device (10) includes a rope holding arrangement in the form of a holding section (16), which has a first member (18) and a second opposing member (20). The rope (12) fitted between the members (18 and 20) in a holding arrangement that deforms the twisted construction of the rope (12) so the strands (13, 14,15) are laid inline to each other in the holding section (16). The first member (18) is adapted such that it is locatable within a groove (30) defined between strands (14,15), the second opposing member (20) is adapted such that it deforms the twisted construction of the rope (12) and lays the strands (13,14,15) inline to each other in order to retain the device (10) at the rope (12) without imparting compressive forces to the rope (12) outer most diameter or the rope strand diameters (13,14,15) to withstand large weights, loads or forces 33 applied to the rope (12) or device (10) with the axis (32) of the device (10), axis (34) of the rope (12) and groove (30) having a substantially parallel relationship between each other, the twisted form of the rope (12) cannot pass through the holding section (16), the device (10) remains in its applied position.

10 Claims, 8 Drawing Sheets

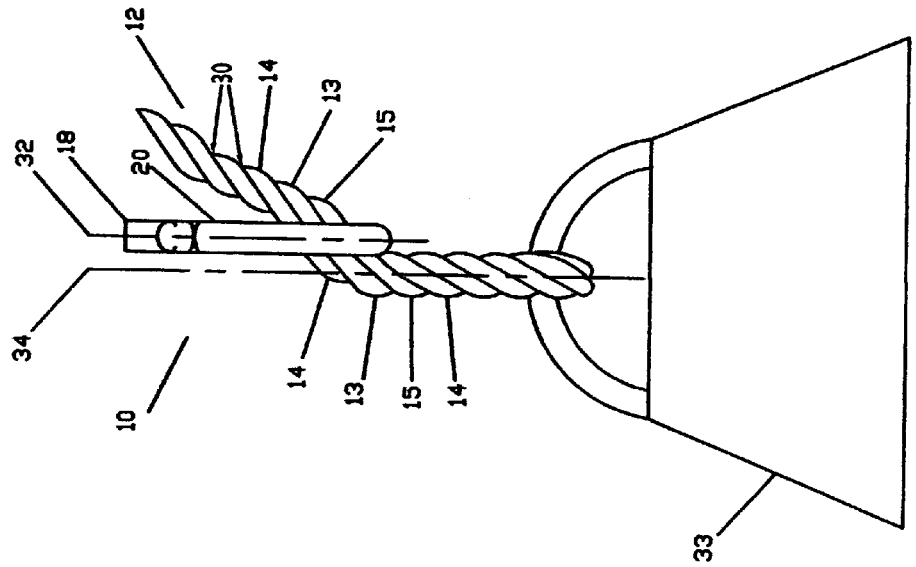
Figure 4
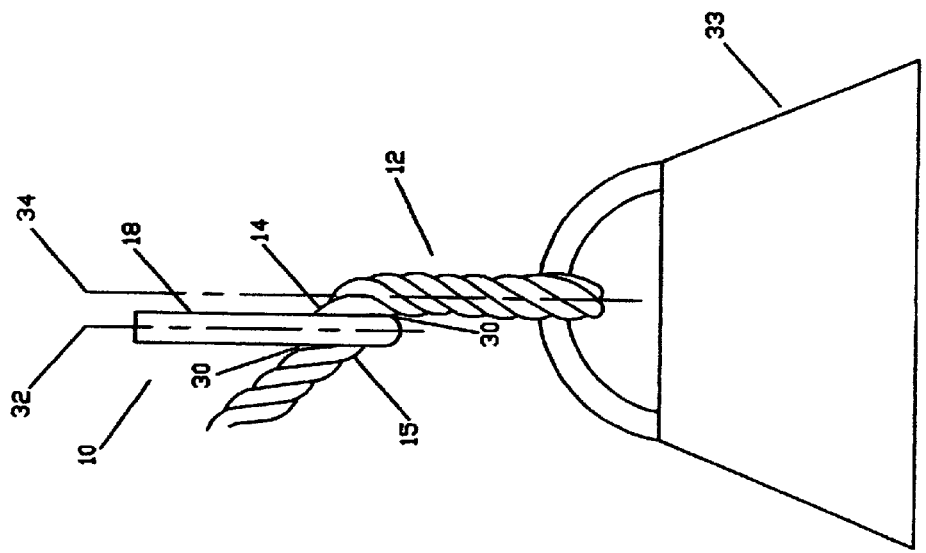
Figure 4 A
Figure 4 B

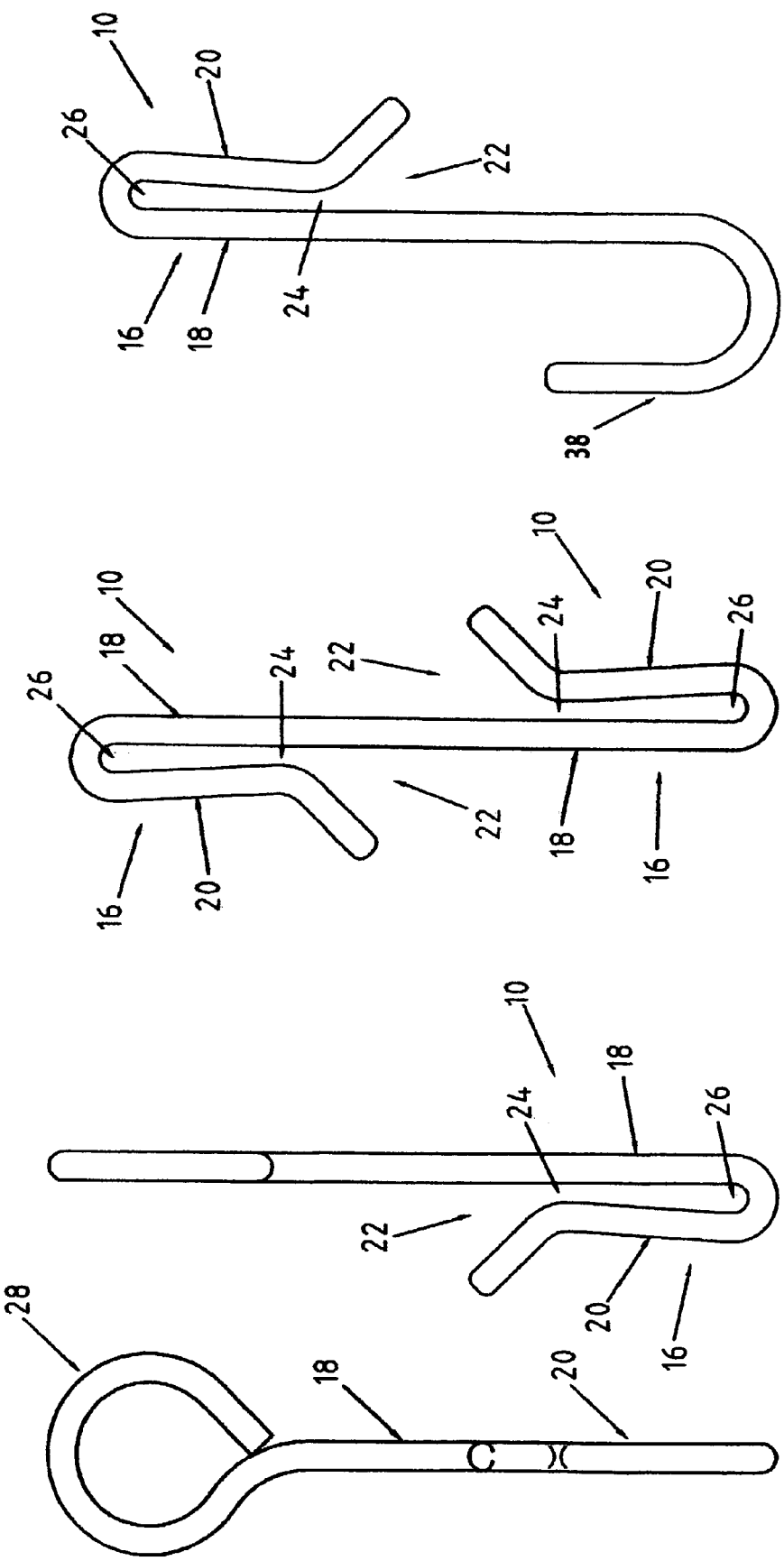

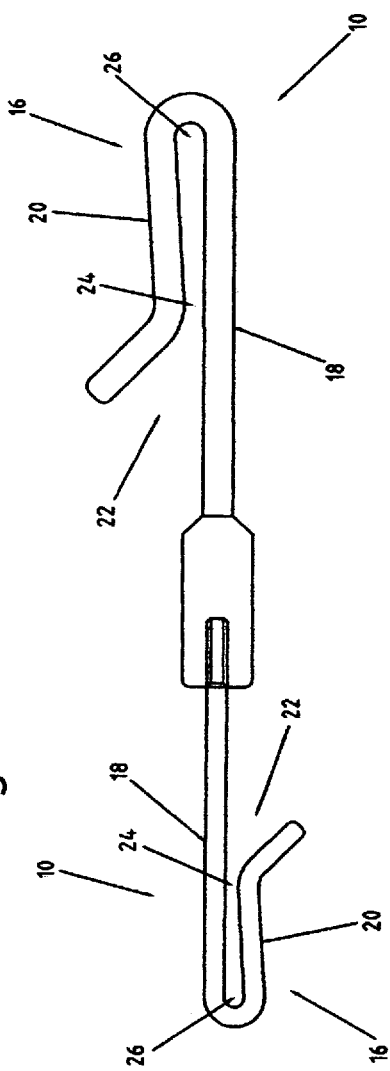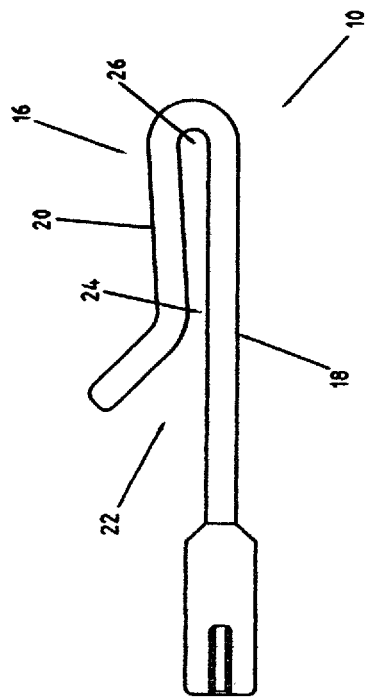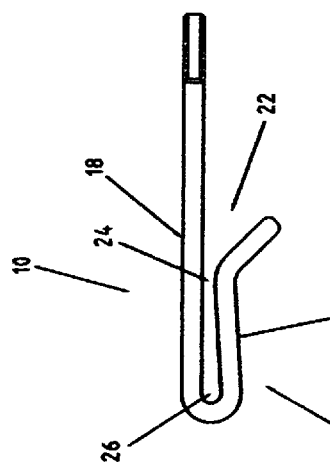

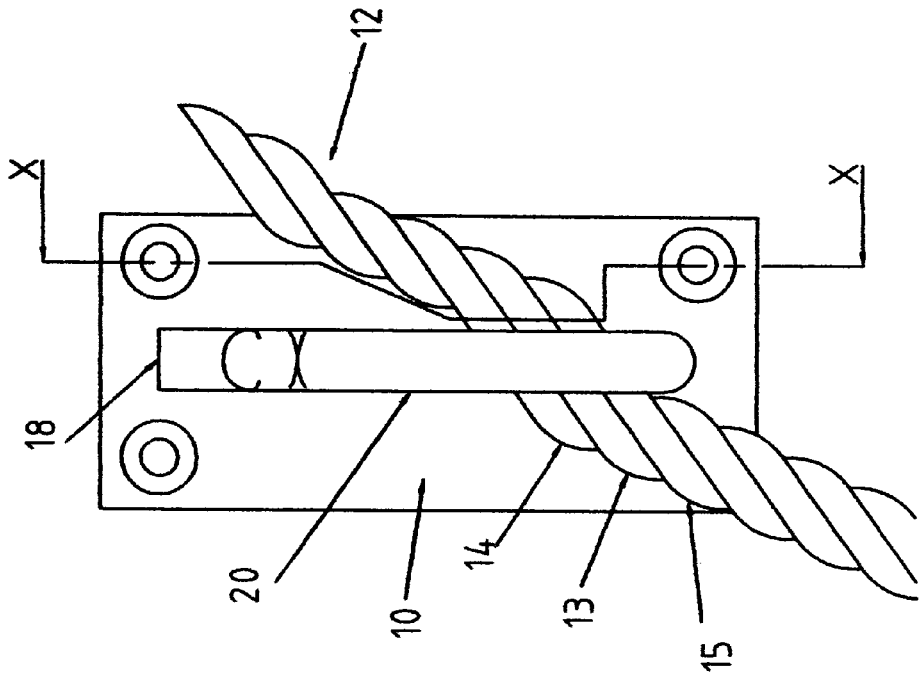
Figure 9
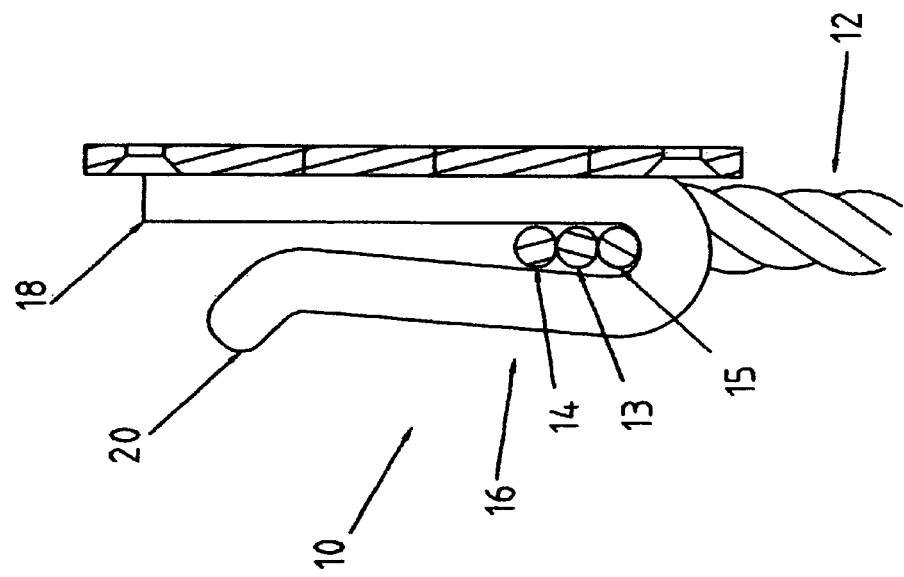
Figure 9 A
Figure 9 B

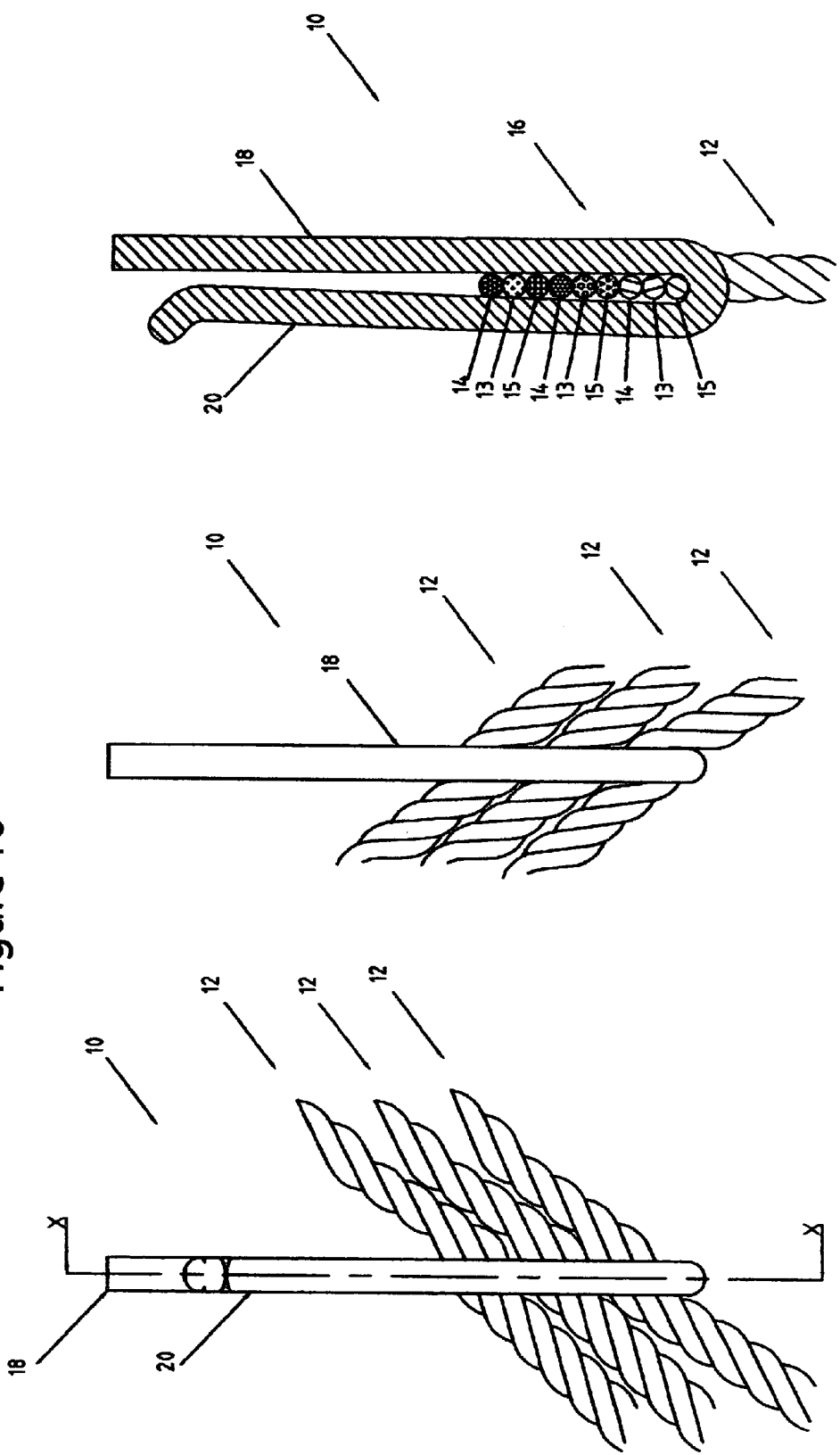

DEVICE FOR ATTACHMENT TO A ROPE

FIELD OF THE INVENTION

The present invention relates to a device for attachment to a rope. In one form the invention relates to a device for linkage with a rope in order to secure the rope and will primarily be described with reference to this context. While the device offers improved methods for securing nylon rope over conventional knotting, when the term "rope" is used herein it refers to any rope, of any material type including, however not limited to, nylon, manila, polypropylene film, polyester, sisal or hemp, formed from twisted strands, however its use on rope having three twisted strands is typical. It should be remembered, however, that the invention has broader use in rope joining applications for joining of a rope either to itself, to another rope or another object as an improvement to known rope tying methods.

The present invention was developed to eliminate the difficult task of tying knots when securing the anchor rope of a vessel to a springer bridle or swing rope. The springer bridle acts as a shock absorber for a boat thereby reducing the effects of sea conditions and provides more comfortable conditions on board. Connecting the springer bridle to the anchor rope is often performed in rough sea conditions making it difficult and dangerous when attempting to tie knots in an intermittently taut rope with an intermittent large force applied to the rope, which also necessitates for other features of this invention. The invention requires having a robust construction to facilitate being applied to a taut rope and withstand these large weights, loads or forces and not move from its applied position. The invention also eliminates having to remove knots from the rope, that have pulled tight due to the large weights, loads or forces, a task that often results in cutting the rope to remove the knot. Knots and damage to a rope caused by knots that have been removed create week points in the rope and are the often cause of rope breakage.

BACKGROUND ART

Methods for securing ropes are known in the art. The knotting of ropes around hooks or other securing means is normally affected by manually securing the ropes and relying on the strength or sophistication of the knot used, particularly nylon rope, which requires complex knots to prevent slippage. Many persons are not adept at knot tying using course rope, which of course can lead to the knot eventually untying or slipping. Knots cannot be tied in a rope that is taut.

Some devices are known in the art for clamping, wedging or fastening to a rope. The devices disclosed in U.S. Pat. No. 4,745,663, U.S. Pat. No. 2,642,640 and U.S. Pat. No. 793,505 require the knotting of ropes around their device and rely on the sophistication of knotting between the device and the rope for securing. Furthermore, these devices cannot be applied to a taut rope. U.S. Pat. No. 5,636,413 U.S. Pat. No. 2,546,260 U.S. Pat. No. 1,452,338 U.S. Pat. No. 179,063 U.S. Pat. No. 360,769 U.S. Pat. No. 107,952 and Australian patent applications 35565/68, 26665/71, 85044/91 and 45080/96 all have clamping or wedging portions of a specified width or thickness. These devices are designed to grip a rope on its outermost diameter and do not have holding sections adapted to grip a rope by means of locating in the twist of the rope and laying the strands of the rope inline to each other whilst in the holding section of the device. Many of these devices have holding sections that are parallel or increase in width from the innermost surface of the holding section toward the opening for receiving the rope. This form is required by these devices to apply a clamping or wedging force to the outer most diameter of the rope and or receive a range of rope diameters. The further the rope is placed into the apparatus to achieve the clamping or wedging force on the outside diameter of the rope the width of the opening for receiving the rope increases. This is a disadvantage of such apparatus as the holding sections of these devices are not adapted to grip a rope by means of locating in the twist of the rope and laying the strands of the rope inline to each other whilst in the holding section of the device, typically a single strand diameter is half that of the ropes twisted construction diameter. It is a further disadvantage of such apparatus since without extreme frictional engagement with the rope surface when place under tension the apparatus will not remain in its applied position with some devices requiring knots to be tied to prevent slippage, and particularly if the rope is greased, muddy or wet.

It is to be understood that, if any prior art publication is referred to herein, such reference does not constitute an admission that the publication forms part of the common general knowledge in the art, in Australia or any other country.

SUMMARY OF THE INVENTION

The present invention provides a device for attachment to a rope formed from twisted strands, however its use on rope having three twisted strands is typical, the device including a holding section which includes a first member and a second opposing member, the rope being received between the members in a holding arrangement when fitted there between, wherein one member is adapted such that it is locatable within a groove defined between adjacent strands in the rope whilst deforming the twisted construction of the rope so the twisted strands are laid flat by the opposing member, laying each strand inline to each other whilst in the holding section allowing the rope to return to its twisted construction either side of the holding device in order to hold the rope at the device without imparting compressive forces to the rope outer most diameter or the rope strand diameters, to withstand large weights, loads or forces applied to the rope or device with the axis's of the device, rope and groove between adjacent rope strands having a substantially parallel relationship between each other, the twisted form of the rope cannot pass through the holding section, the device remains in its applied position and wherein the holding arrangement defines:

an opening between the first member and second opposing member for receiving the rope there through and for directing the rope to a throat that is adjacent to the opening, which is adapted for deforming the twisted construction of the rope so that each strand is laid inline to each other; and a yoke from which the throat extends and which is adapted for receiving and maintaining the deformed twisted construction of the rope therein and retaining the inline laid strands of the rope once it has passed through the throat; and wherein the diminishing width of the yoke to the throat is relative to the outermost diameter of one single strand of the rope so that one single device may only suit ropes of a similar size.

The device provides an improved method for securing ropes which readily facilitates their tying and untying in a simple and rapid fashion along with an improvement in the safety aspects of disengaging joined ropes without loss or destruction of the rope. When ropes are mounted in the device typically no slippage can occur when the ropes are placed under strain since the rope groove receives at least the first member therein, the twisted form of the rope cannot pass through the narrow holding section and is retained thereby. However, the ropes may easily be detached by hand using a reverse pushing action.

Preferably the throat has a width less than the diameter of one single strand of the rope for deforming the twisted construction of the rope and the yoke is also adapted for receiving the deformed twisted construction of the rope and maintaining the inline laid strands of the rope therein without imparting compressive forces to the rope strand diameters. More preferably the throat has a width two-thirds the diameter of one strand of the rope and the yoke has a width the diameter of one single strand of the rope.

Preferably the holding arrangement is an interference type holding arrangement when a weight, load or force is applied to the rope or device.

Preferably either the rope strands compress and/or the throat deforms to enable passage of the single strands of the rope into the yoke.

Preferably the first and second members generally define a deformed "J" shape holding section in plan elevation.

Preferably the first and second members are formed from a single piece of a hardy material with a cross section similar to or greater than the diameter of one single strand of the rope.

Preferably at least one of the members is adapted to be joined to a further linkage means located at an end of the device remote from the holding arrangement.

Preferably the further linkage means may comprise of a ring structure, a clip a second like holding device or a hook structure, to enable attachment to the same or another rope.

Preferably the device is formed from a material that is hardy to allow repeated insertion, and removal of rope or ropes whilst retaining structural strength to compress the rope strands and deforms the twisted construction of the rope.

Preferably at least one of the members is adapted to be joined to a flange for further linkage to a surface.

BRIEF DESCRIPTION OF THE DRAWINGS

Notwithstanding any other forms, which may fall within the scope of the present invention, preferred forms of the invention will now be described, by way of example only, with reference to the accompanying drawings in which:

FIG. 4A shows a back view of the embodiment of FIG. 2 attached in use to a rope with a load applied;

FIG. 4B shows a front view of the embodiment of FIG. 2 attached in use to a rope with a load applied;

FIG. 5A shows a front view of a further embodiment of a device for attachment to a rope in accordance with the invention;

FIG. 5B shows a plan view of a FIG. 5A of a device for attachment to a rope in accordance with the invention;

FIG. 6 shows a plan view of a further embodiment of a device for attachment to a rope in accordance with the invention;

FIG. 7 shows a plan view of a further embodiment of a device for attachment to a rope in accordance with the invention;

FIG. 8A shows a plan view of a further embodiment of a device for attachment to a rope in accordance with the invention;

FIG. 8B shows a plan view of an embodiment for attachment to FIG. 8a in accordance for attachment to a rope with the invention;

FIG. 8C shows a plan view of FIG. 8B attached to FIG. 8A of a further embodiment of a device for attachment in accordance with the invention;

FIG. 9A shows a front view of a further embodiment of a device when attached to a rope in accordance with the invention;

FIG. 9B shows a sectional view "XX" of FIG. 9A a further embodiment of a device when attached to a rope in accordance with the invention;

FIG. 10A shows a front view of a further embodiment of a device when attached to a rope in accordance with the invention;

FIG. 10B shows a back view of a further embodiment of a device when attached to a rope in accordance with the invention;

FIG. 10C shows a sectional view "XX" of FIG. 10A a further embodiment of a device when attached to a rope in accordance with the invention;

MODES FOR CARRYING OUT THE INVENTION

Figure 1:
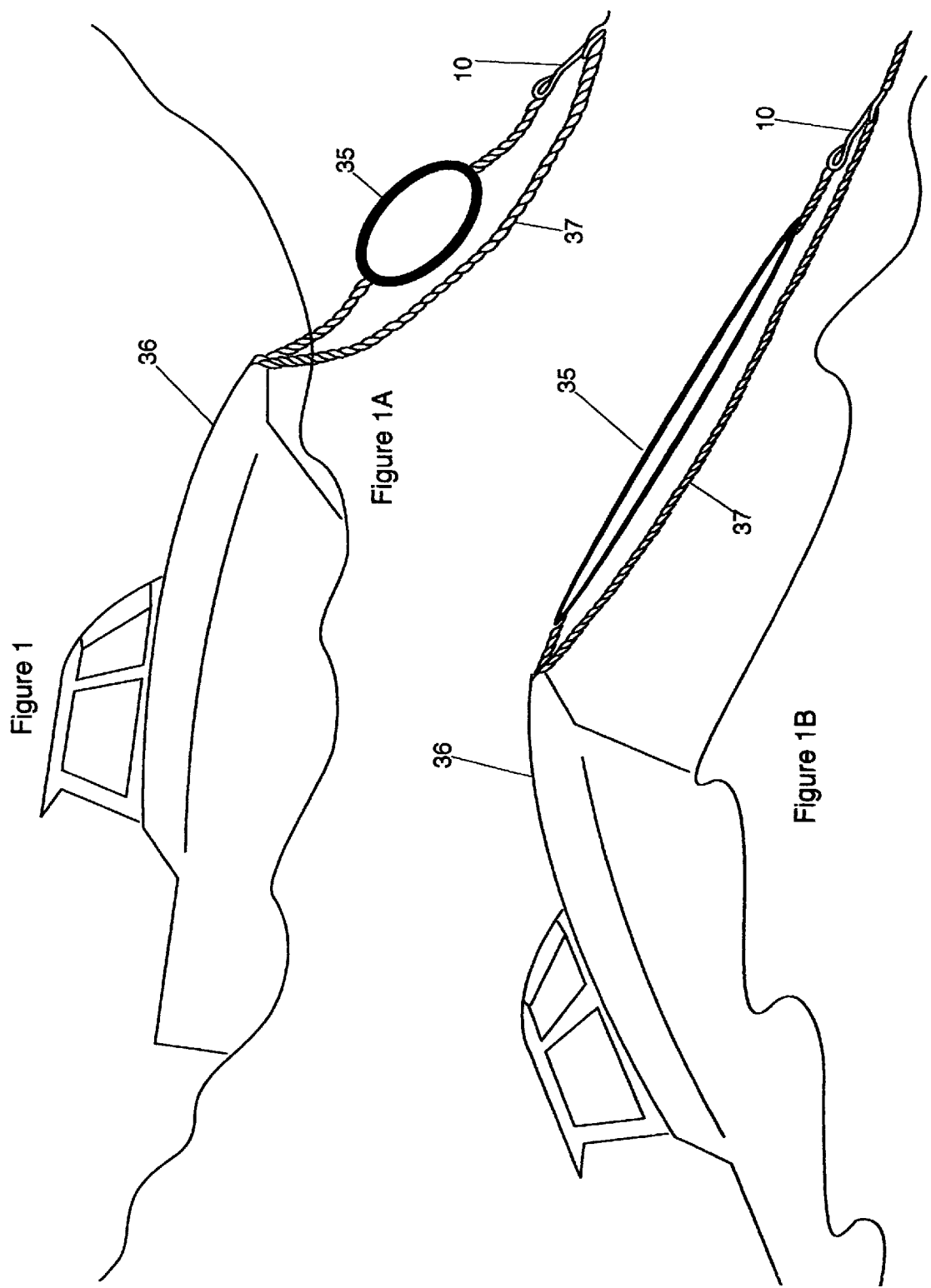
FIG. 1A shows an application view of an embodiment of a device when used in a nautical application in the trough of a swell.
FIG. 1B shows a further application view of an embodiment of a device when used in a nautical application on the crest of a swell.
Figure 2:
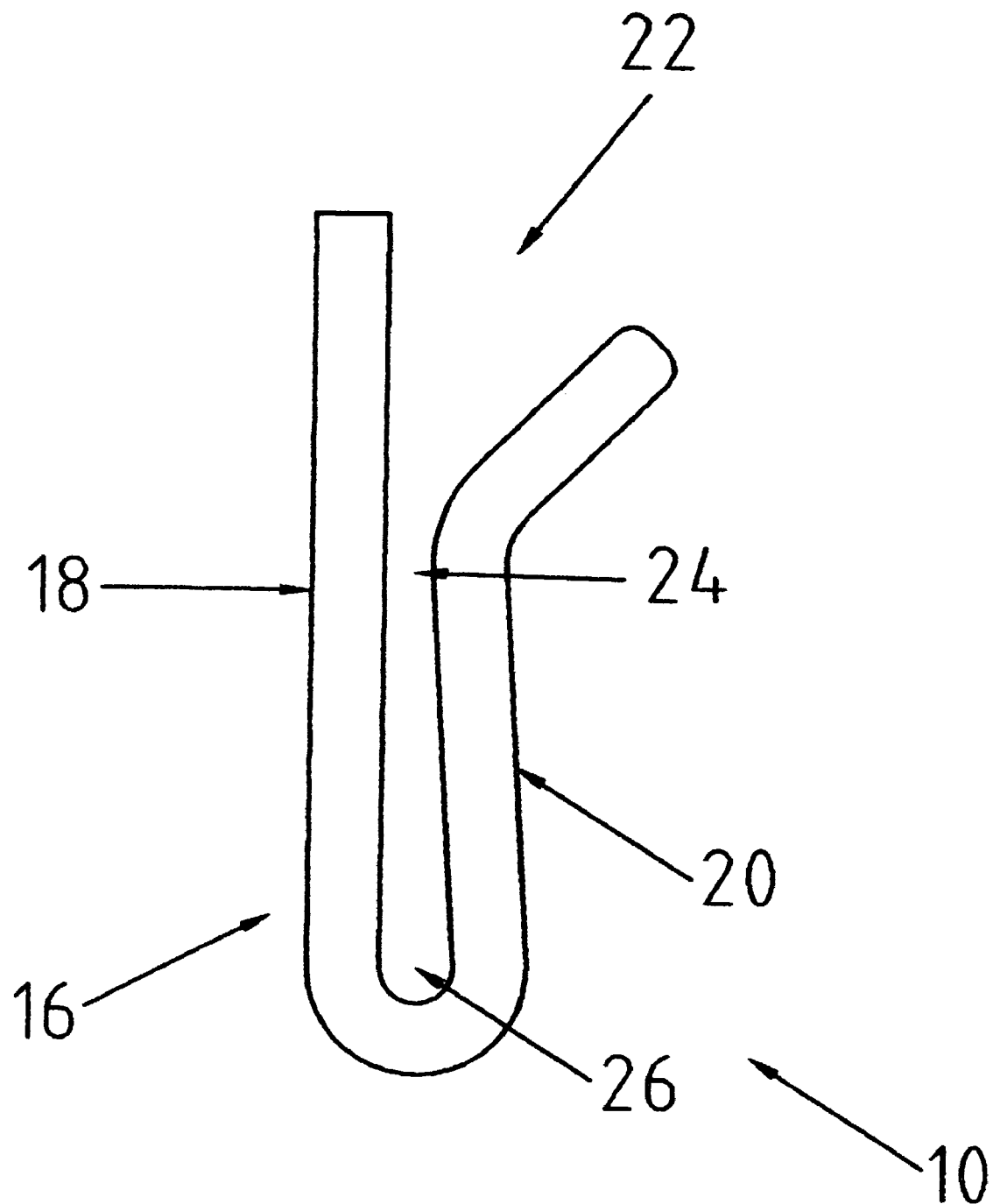
FIG. 2 shows a plan view of one embodiment of a device for attachment to a rope in accordance with the invention.

Referring to the drawings, a device 10 is shown for attachment to a rope 12, where the rope 12 is formed from three twisted strands 13,14,15. However the device can be attached to a rope comprised of any number of twisted strands. The device 10 includes a rope holding arrangement in the form of a holding section 16, which has a first member 18 and a second opposing member 20. The rope 12 fitted between the members 18 and 20 in a holding arrangement that deforms the twisted construction of the rope 12 so the strands 13,14 and 15 are laid inline to each other in the holding arrangement (see FIG. 3B and FIG. 3D). The first member 18 is adapted such that it is locatable within a groove 30 defined between strands 14 and 15 in the rope 12 (see FIG. 3A and FIG. 3C), the second opposing member 20 is adapted such that it deforms the twisted construction of the rope 12 and lays the strands 13,14 and 15 inline to each other in order to retain the device 10 at the rope 12 without imparting compressive forces to the rope 12 outer most diameter or the rope strand diameters 13,14 and 15, to withstand large weights, loads or forces 33 applied to the rope 12 or device 10 with the axis 32 of the device 10, axis 34 of the rope 12 and groove 30 having a substantially parallel relationship between each other, the twisted form of the rope 12 cannot pass through the holding section 16, the device 10 remains in its applied position (see FIG. 4). In the particular embodiment shown the members 18 and 20 are formed from one piece of material to form a hook like device.

The holding section 16 comprises an opening 22 defined between the first member 18 and second opposing member 20 for receiving the rope 12 therethrough. The throat 24 is a narrow region, which typically has a width less than the diameter of one strand of the rope 12. Most typically the throat 24 has a width equivalent to two-thirds of the diameter of one strand 13,14,15 of the rope 12. The rope strands 13,14 and 15 are compressed and/or the member 20 is deflected outwardly at its free end so that the opening 22 directs the rope 12 to the throat 24 where the twisted construction of the rope 12 is deformed so that strands 13,14 and 15 are laid inline to each other as each strand 13,14 and 15 passes through the throat 24. A yoke region 26 from which the throat 24 extends finally receives the inline laid strands 13,14 and 15 once they have passed through the throat 24. Typically the holding section 16 has a diminishing width from the inner most surface of the yoke 26 to the throat 24 for receiving the rope, the yoke region 26 has a width equivalent to one rope strand diameter 13,14 and 15 of the rope 12 and a length equivalent to six rope strand diameters 13,14 and 15, although any length is within the scope of the invention particularly if multiple ropes are to be accommodated in the yoke, as shown in FIGS. 10 A, 10 B and 10 C.

In a typical mode of use, the rope 12, strands 13,14,15 and/or the member 20 deform at the throat 24 sufficiently to enable passage of the inline laid strands 13,14 and 15 into the yoke region 26. The yoke region 26 is typically sized so that the rope 12 is securely retained in the holding section 16 without imparting compressive forces from members 18 and 20 to the rope 12 outer most diameter or the rope strand diameters 13,14 and 15 (see FIG. 3D). The materials of manufacture of the device 10 are typically hardy to allow repeated insertion and removal of rope 12 without permanently deforming whilst retaining structural strength to compress the rope strands 13,14,15, deform the twisted construction of the rope 12 and remain in its applied position when a weight, load or force 33 is applied to the rope 12 or device 10. (eg steel, stainless steel, moulded plastic)

First member 18 can be joined to a further linkage means located at an end of the device 10 located at an end of the member 18. The further linkage means is depicted as a ring structure 28 in FIG. 5A, although, as shown in FIG. 6 it can also comprise a second like holding section 16 to enable the device 10 to be retained at or onto the same rope 12 or onto another rope. Alternatively the further linkage means can comprise any other suitable linkage device of any shape to enable connection of the apparatus to another cord or the like, to a surface, or to for example a clasp, hook, screw thread, snap fit coupling etc. Some examples of alternative linkage means are depicted in FIGS. 5, 6, 7, 8 and 9, although this is not an exhaustive set of examples.

Figure 3:
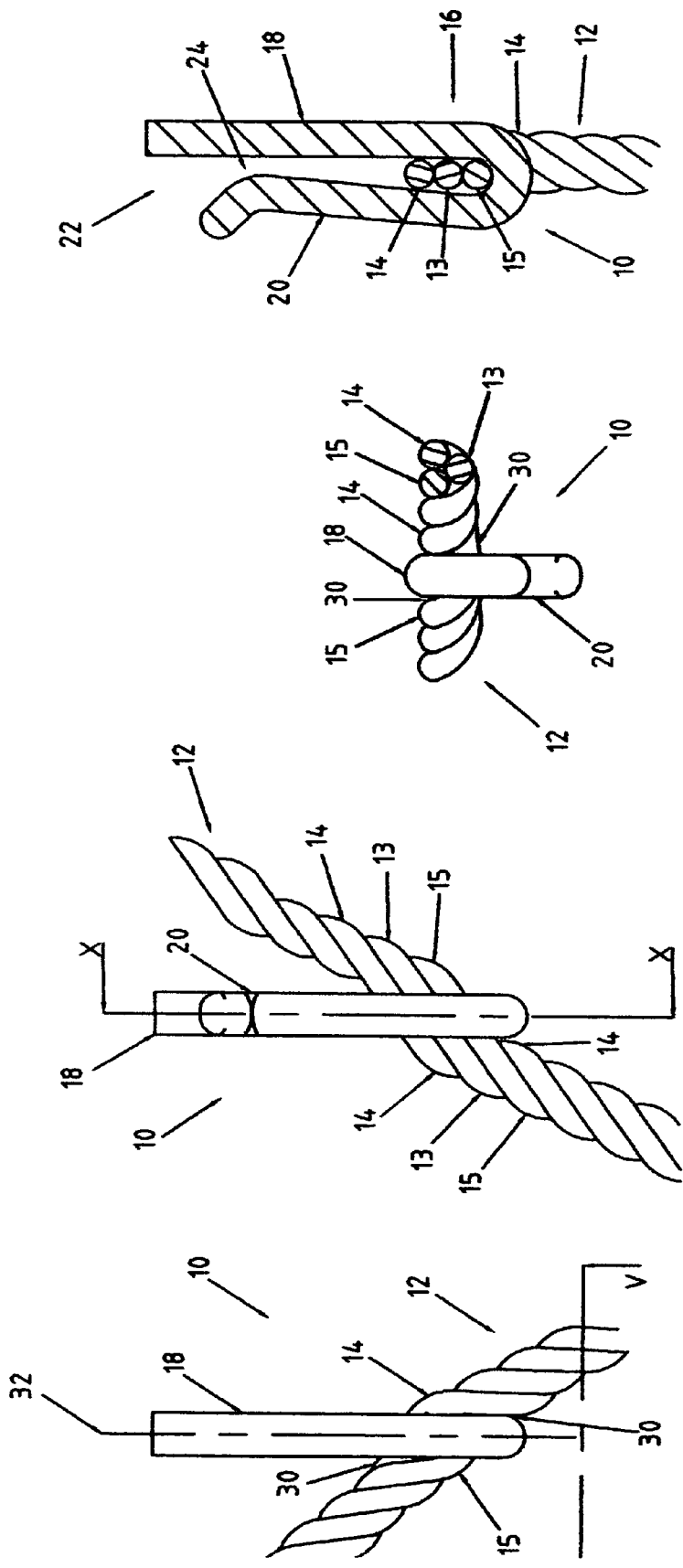
FIG. 3A shows a back view of the embodiment of FIG. 2 attached in use to a rope.
FIG. 3B shows a front view of the embodiment of FIG. 2 attached in use to a rope.
FIG. 3C shows an end view "VV" of the embodiment of FIG. 2 attached in use to a rope.
FIG. 3D shows a sectional view "XX" of the embodiment of FIG. 2 attached in use to a rope.

As shown in FIG. 3A and in more detail in FIGS. 3C and 3D, when applied to the rope 12 in order to enhance engagement a groove 30 (defined between strands 14 and 15) locates itself substantially parallel to a longitudinal axis of the member 18 typically with the first member 18 being adapted for lying within the groove (where preferably at least part of the innermost surface of the yoke region 26 locates in the groove 30). When a weight, load or force 33 is applied to the rope 12 as shown in FIGS. 4A and 4B a interference engagement occurs between rope strands 15 and member 18 (see FIG. 3C), therefore holding the device within groove 30 and retaining the device 10 in position on rope 12 with the longitudinal axis's 32 of the device 10, groove 30 and the longitudinal axis 34 of rope 12 being in a substantially parallel relationship to each other. This is advantageous when ropes are mounted in the holding section 16 no slippage can occur when the ropes are placed under strain. This is particularly advantageous if the ropes are greased, muddy or wet. However, the ropes may easily be detached by hand using a reverse pushing action.

As shown in FIGS. 5, 6, 7, 8, and 9 the holding sections can be at remote ends of member 18, or located at any point along member 18. In a further embodiment of the device shown in FIGS. 10A, 10B and 10C, a number of ropes may be positioned into the yoke region 26 of the device.

The devices as describe are particularly useful as a means of joining two ropes of similar or differing sizes in order to secure them together. FIGS. 6 and 8c facilitates the device to join two ropes. FIG. 8 facilitates for ropes of differing sizes, FIG. 8A suits a small diameter rope and FIG. 8B suits a larger size rope. FIG. 6 the devices at each end are the same size allowing it only to join ropes of a similar size. This facilitates for rapid attachment and removal of either rope.

The device is useful for forming a loop in a rope for securing or retaining two or more objects together. FIG. 5 allows the device to be permanently attached to a rope at one end with the use of an eye splice to the ring structure 28 and having the device for rapid and secure attachment and removal to another rope. An example of this is nautical applications when securing a anchor rope 37 of a vessel 36 to a springer bridle 35 or swing rope (see FIGS. 1A and 1B), or another moorage rope, for example, a tautly pulled knot often cannot be undone when place under strain from the vessel 36 and the swell of the ocean, so that eventually ropes need to be cut to be untied. This is often a dangerous task and, even if attempts are made to untie the knot using pliers, fid or a screwdriver, the rope can be permanently damaged. Sometimes even if the rope is untied, a permanent kink in the rope results, thus reducing the strength of the rope, causing the rope to break. Use of the devices described can ensure that ropes can be unhitched speedily without damage. This provides a convenient and safe alternative to cutting tightly strained ropes.

The devices described are also advantageous in that when ropes are mounted in the holding section 16 no slippage can occur when the ropes are placed under strain since the groove 30 receives at least first member 18 therein and is held thereby. This is particularly advantageous if the ropes are greased, muddy or wet. However, the ropes may easily be detached by hand using a reverse pushing action. Further applications for the devices, which may require the securing of ropes where possibly large weights, loads or forces could be encountered, include the erection of tents and marques, the erection of banners and securing tarpaulins over a storm damaged roof of a house or building. FIG. 7 facilitates for any number of objects to be attached to a rope utilizing hook 38. Another application that may require the securing of a rope to withstand large weights, loads or forces could be securing loads on trucks etc. FIG. 9 facilitates securing a rope to a surface. This could be particularly useful in retaining loads on trucks or to a fixed surface such as a wall. The device can be applied to a taut rope in order to secure another rope to the already taut rope. This is particularly advantageous over tying knots in this application as it is extremely difficult to tie a knot that will not slip along the taut rope.

It is preferred that the devices be formed from strong and hardy material to ensure good securement of the ropes and to withstand the environment of use. A material such as stainless steel is suitable in an environment exposed to the weather or marine conditions, although hard plastic-type material is also suitable. The device may also be formed from a single piece of material with a cross section similar to or greater than the diameter of one single strand of the rope, which is then best, formed as appropriate.

In the embodiments of the invention shown, the attachment to a rope can provide improvements in the speed of operation in rope tying applications, along with an improvement in the safety aspects of disengaging joined ropes without loss or destruction of the rope. The apparatus provides an improved method for securing ropes which readily facilitates their tying and untying in a simple and rapid fashion.

Whilst the invention has been described with reference to a number of preferred embodiments it should be appreciated that the invention can be embodied in many other forms.

For the purposes of this specification it is to be clearly understood that the word "comprising means "including but not limited to" and that the word "comprise" has corresponding meaning.

The invention claimed is:

1. A device for attachment to a rope formed from twisted strands, the device including a holding section which includes a first member and a second opposing member, the rope being received between the members in a holding arrangement when fitted there between, wherein one member is adapted such that it is locatable within a groove defined between adjacent strands in the rope whilst deforming the twisted construction of the rope so the twisted strands are laid flat by the opposing member, laying each strand inline to each other whilst in the holding section allowing the rope to return to its twisted construction either side of the holding device in order to hold the rope at the device without imparting compressive forces to the rope outer most diameter or the rope strand diameters, to withstand large weights, loads or forces applied to the rope or device with the axis's of the device, rope and groove between adjacent rope strands having a substantially parallel relationship between each other, the twisted form of the rope cannot pass through the holding section, the device remains in its applied position and wherein the holding arrangement defines:

an opening between the first member and second opposing member for receiving the rope there through and for directing the rope to a throat that is adjacent to the opening, which is adapted for deforming the twisted construction of the rope so that each strand is laid inline to each other; and a yoke from which the throat extends and which is adapted for receiving and maintaining the deformed twisted construction of the rope therein and retaining the inline laid strands of the rope once it has passed through the throat; and wherein the diminishing width of the yoke to the throat is relative to the outermost diameter of one single strand of the rope so that one single device may only suit ropes of a similar size.

2. A device as claimed in claim 1 wherein the throat has a width less than the diameter of one single strand of the rope for deforming the twisted construction of the rope and the yoke is also adapted for receiving the deformed twisted construction of the rope and maintaining the inline laid strands of the rope therein without imparting compressive forces to the rope strand diameters.

3. A device as claimed in claim 1 wherein the holding arrangement is an interference type holding arrangement when force is applied to the rope.

4. A device as claimed in claim 1 wherein either the rope strands compress and/or the throat deforms to enable passage of the single strands of the rope into the yoke.

5. A device as claimed in claim 1 wherein the first and second members generally define a deformed "J" shape in plan elevation.

6. A device as claimed in claim 1 wherein the first and second members are formed from a single piece of a hardy material with a cross section similar to or greater than the diameter of one single strand of the rope.

7. A device as claimed in claim 1 wherein at least one of the members is adapted to be joined to a further linkage means located at an end of the device remote from the holding arrangement.

8. A device as claimed in claim 7 wherein the further linkage means may comprise of a ring structure, a clip, a second like holding device as described in claim 1, or a hook structure to enable attachment to the same or another rope.

9. A device as claimed in claim 1, which is formed from a material that is hardy to allow repeated insertion, and removal of rope or ropes whilst retaining structural strength to compress the rope strands and deforms the twisted construction of the rope.

10. A device as claimed in claim 1 wherein at least one of the members is adapted to be joined to a flange for further linkage to a surface.

* * * * *